United States Patent [19]
Gavet

[11] Patent Number: 5,809,934
[45] Date of Patent: Sep. 22, 1998

[54] AUTOMATIC PORTABLE DRINKING DEVICE FOR ANIMALS

[76] Inventor: Philippe J. L. Gavet, 205 Somerset Way, Fort Lauderdale, Fla. 33326

[21] Appl. No.: 736,518

[22] Filed: Oct. 24, 1996

[51] Int. Cl.[6] .................................................... A01K 5/00
[52] U.S. Cl. ............................................................. 119/52.1
[58] Field of Search ........................ 119/52.1, 53, 53.5, 119/54, 72, 72.5, 74, 75, 77

[56] References Cited

U.S. PATENT DOCUMENTS

| | | | |
|---|---|---|---|
| 2,094,194 | 9/1937 | Swanson | 119/77 |
| 3,536,046 | 10/1970 | Lippi . | |
| 3,720,184 | 3/1973 | Pearce . | |
| 3,782,332 | 1/1974 | Depenthal et al. . | |
| 4,034,715 | 7/1977 | Arner . | |
| 4,192,256 | 3/1980 | Clugston . | |
| 4,281,624 | 8/1981 | Raines | 119/52.1 |
| 4,513,688 | 4/1985 | Fassauer . | |
| 4,651,679 | 3/1987 | Fassauer . | |
| 4,721,063 | 1/1988 | Atchley | 119/52.1 |
| 4,860,691 | 8/1989 | Mayer . | |
| 4,895,109 | 1/1990 | DeGroot et al. . | |
| 4,922,858 | 5/1990 | Ahrens . | |
| 4,947,796 | 8/1990 | Robinette . | |
| 5,033,411 | 7/1991 | Brucker | 119/52.2 |
| 5,174,245 | 12/1992 | Bishop . | |
| 5,259,336 | 11/1993 | Clark . | |
| 5,335,624 | 8/1994 | Baxter et al. . | |
| 5,488,927 | 2/1996 | Lorenzana et al. . | |

*Primary Examiner*—Thomas Price
*Attorney, Agent, or Firm*—Malin, Haley, DiMaggio & Crosby, PA

[57] ABSTRACT

An automatic water dispensing device comprises main container/tank, a trough extending from the lower front end of the container that receives fluid from the tank for drinking by an animal, a flow control valve fluidly communicating the trough and container such that the valve automatically controls the flow of fluid into the trough, an arcuate recessed opening for providing clearance when drinking, a plurality of hooks or notched tabs to prevent movement by the animals or during travel, a fluid monitoring gauge and an inwardly oriented spill resistant lip defined near the upper edge of the trough.

20 Claims, 4 Drawing Sheets

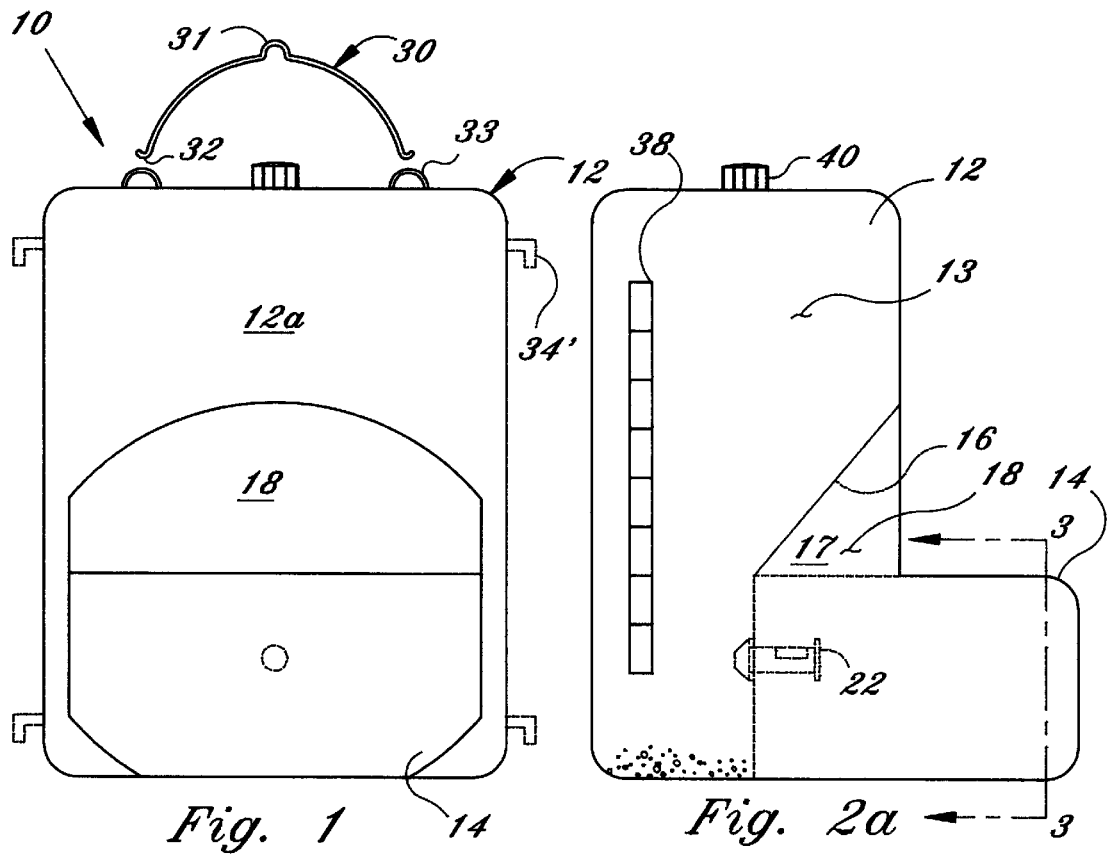
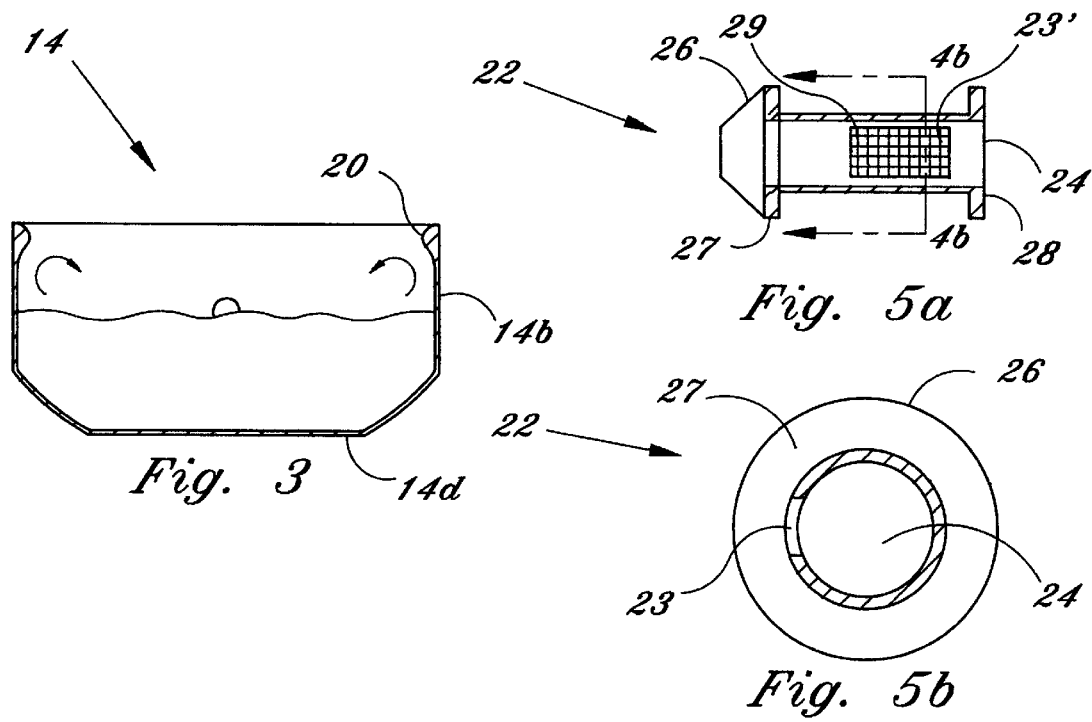
Fig. 1
Fig. 2a
Fig. 3
Fig. 5a
Fig. 5b

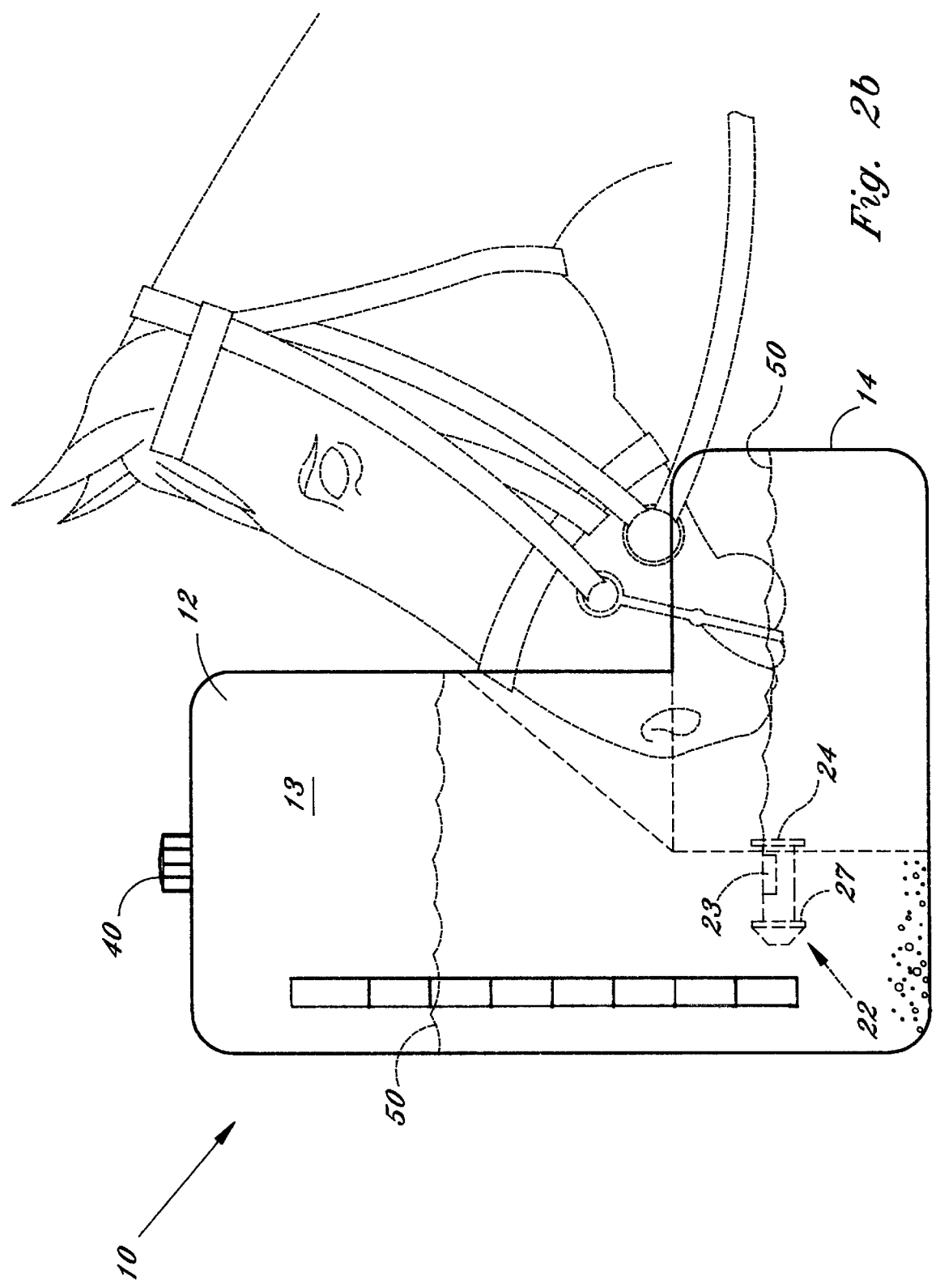

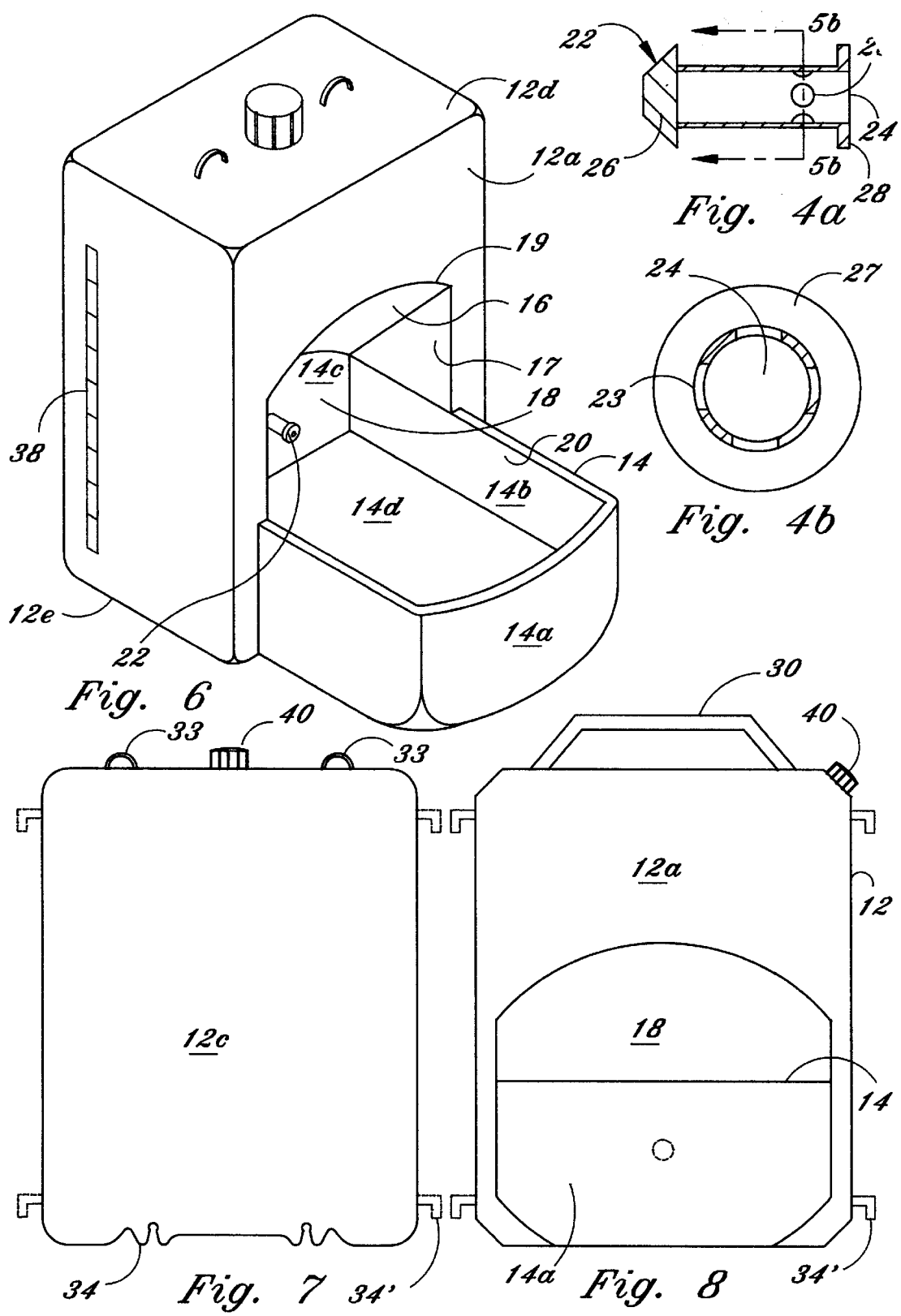

AUTOMATIC PORTABLE DRINKING DEVICE FOR ANIMALS

BACKGROUND OF THE INVENTION

1. Field of the Invention

This invention relates generally to an automatic water dispenser for animals, and more particularly, to an automatic and portable water dispenser and trough that automatically replenishes water consumed from the trough, structurally provides comfortable room for the animal to drink and conveniently facilitates use during transport, such as in a horse trailer, truck or automobile, to prevent dehydration of the animal.

2. Description of the Background Art

Providing a constant supply of clean water to livestock, such as horses, and pets is vital for preventing dehydration and illness, and is a well known challenge. It is especially challenging on large tracts of land, such as farms, when travelling with the animal or at times when the owner is away for an extended period of time to maintain a proper supply of clean water. Although alternative solutions have been made available, it has been determined that many needs are not being satisfied by these conventional drinking devices. Existing watering bowls or devices do not provide adequate clearance or space for livestock, especially horses, and pets to comfortably and easily drink the water. Known drinking units are easily moved or spilled by the animal and they fail to prevent spillage due to overflow when the animals are drinking or being transported. The ability to monitor the amount of fluids the animal drinks or to measure the concentration of medicines combined with the water, also appears to be lacking with known watering devices. Finally, known units are not sufficiently portable and do not provide sufficient structure for securing the units to prevent movement and spills.

Many automatic drinking and feeding devices for livestock and pets are contemplated in the background art, however, none of these solve or adequately address the above noted problems. For instance, Clugston, U.S. Pat. No. 4,192,256, and Pearce, U.S. Pat. No. 3,720,184, teach combined feeding and watering devices. The Clugston device comprises a water compartment having a top cavity formed for dry food and a drinking cup extending from and cooperatively designed with the compartment to provide a constant supply of water. The Pearce device comprises a container for liquid or solid material positioned over a ramp and having a spout which dispenses the container contents onto the ramp and into a dish until the spout is obstructed. The Clugston and Pearce devices, however, can not be secured to prevent movement, do not have an adjustable shut-off valve, lack structure facilitating convenient use by horses or other livestock, and are incapable of preventing spillage. Robinette, U.S. Pat. No. 4,947,796, discloses a dog feeder apparatus comprising a water tank which provides water into a forwardly oriented bowl and a dry food tank which provides food into a second forwardly oriented bowl wherein the water bowl fluidly communicates with the dry food bowl. Like Clugston and Pearce, Robinette does not have an adjustable shut-off valve, is not useable by livestock and is not securable. In addition, Robinette lacks an accessible water basin for drinking. Other devices which fail to provide an automatic drinking device which includes an enhanced opening for convenient, unobstructed use by livestock, an adjustable shut-off valve, structure for securing the unit and structure addressing the other concerns noted above include U.S. Pat. Nos. 3,536,046, 3,782,332, 4,034, 715, 4,513,688, 4,651,679, 4,860,691, 4,895,109, 4,922,858, 5,174,245, 5,259,336, 5,335,624 and 5,488,927.

As the above noted background art neither solves nor addresses the problems contemplated by the present invention, there remains a need for an animal, and preferably a livestock, drinking device which is portable, securable and capable of providing an automatic, constant supply of clean drinking water, an adjustable shut-off valve through which the flow of water is controlled, structure for preventing fluid spillage, and structure to make it easier and more convenient for livestock and pets to drink the water. The present invention solves these problems by providing an automatic and portable fluid dispensing device for livestock and pets which addresses the above noted concerns by incorporating the structure discussed herein. While the automatic fluid dispenser of the instant invention is described in detail below with respect to livestock, such as horses, the instant invention works well for any pet animal.

SUMMARY OF THE INVENTION

It is an object of the present invention to provide an automatic fluid dispenser which provides a constant supply of clean water.

It is another object of the instant invention to provide an automatic fluid dispenser which is easily secured and transported in livestock trailers, or other vehicles, to provide a constant supply of drinking water without spilling.

It is an additional object of the instant invention to provide an automatic fluid dispenser which is easily carried to select locations.

It is a further object of the instant invention to provide an automatic fluid dispenser which includes a structure that facilitates convenient and easy drinking by livestock and other animals.

It is also an object of the instant invention to provide an automatic fluid dispenser which can be monitored to determine the amount of water being consumed by the animal.

It is yet another object of the instant invention to provide an automatic fluid dispenser which facilitates the addition of medicines into the water in a way which achieves the proper concentration.

In accordance with these and other objects, the present invention provides an automatic fluid/water dispensing device which is preferably useable by horses and livestock, but which is also adaptable for use by pets, such as cats and dogs, and other animals. The dispenser of the instant invention generally comprises a main container/tank, a trough/reservoir extending from the lower front end of the container that receives fluid from the tank for drinking by an animal, a shut-off valve fluidly communicating the trough and container such that the valve automatically controls the flow of fluid into the trough, a recession means for providing convenient access to the trough when drinking, means for securing the dispenser to prevent movement by the animals or during travel, a fluid monitoring gauge and a means for preventing spillage defined by the trough and preferably comprising a spill resistant trough shape, such as a lip projecting inwardly. The automatic fluid dispenser may also comprise a transporting means for carrying the dispenser. The transporting means may include a handle which may be rotatable, adjustable and mountable to a wall hook for securing within a vehicle during transport or in the permanent area in which the animal feeds. The handle also serves to carry the dispenser and may be removable for convenient storage. The securing means of the container may comprise a plurality of hooks or notched tabs defined by the container or attached thereto for attachment to corresponding hardware on a wall for stabilizing-the container so as to prevent movement. In the preferred embodiment the handle works in cooperation with the securing means when hanging the dispenser on a wall to keep the dispenser stabilized. The instant invention has the added benefit of filtering water contaminants and depositing them on the bottom of the tank. To enhance and further effectuate the filtering process a filter screen of a predetermined density may be oriented in the vicinity of the valve or on the valve inlet port to filter water before it flows into the trough.

The instant invention is preferably manufactured through injection molding or similar procedure to reduce costs. Consequently, the water dispenser is preferably made from a material comprising a synthetic plastic, resin composite, polymer plastic, thermo-plastic, fiberglass, synthetic rubber, structural foam or any combination of the foregoing materials. These materials have been found to be durable, light in weight and resistant to excessive wear and tear. Thus, the dispenser can be easily and conveniently transported, carried and supported on truck, trailer, or building wall to prevent movement. Moreover, modifications in size, dimension and structure can be easily and inexpensively achieved with the foregoing materials.

In accordance with these and other objects which will become apparent hereinafter, the instant invention will now be described with particular reference to the accompanying drawings.

BRIEF DESCRIPTION OF THE DRAWINGS

The invention is described in detail below with reference to the accompanying drawings, in which:

FIG. 1 is a front elevational view of a preferred embodiment of the fluid dispenser illustrating the fluid control valve and alternative securing anchors of the present invention;

FIG. 2a is a side elevational view of a preferred embodiment of the fluid dispenser illustrating the fluid control valve in phantom;

FIG. 2b is a side elevational view of the instant invention illustrating the use thereof by a horse shown in phantom;

FIG. 3 is an cross-sectional isolated view of the trough taken along sectional line "3—3" of FIG. 2a illustrating the spill resistant lip in accordance with a preferred embodiment of the instant invention;

FIG. 4a is a cross-sectional view of the preferred embodiment of the fluid control valve of the instant invention, illustrating a plurality of inlet ports;

FIG. 4b is a cross-sectional view of the fluid control valve taken along sectional line "4b—4b" of FIG. 4b;

FIG. 5a is a cross-sectional view of another embodiment of the fluid control valve of the instant invention;

FIG. 5b is a cross-sectional view of the fluid control valve taken along sectional line "5b—5b" of FIG. 5a;

FIG. 6 is a front isometric view of the preferred embodiment of the dispenser of the instant invention;

FIG. 7 is a rear elevational view of a preferred embodiment of the instant invention illustrating notched tabs used in attaching and securing the dispenser to wall hardware and illustrating alternative securing anchors in phantom; and FIG. 8 is a front elevational view of another embodiment of the instant invention illustrating an integrally combined handle and a side oriented fluid fill.

DESCRIPTION OF THE PREFERRED EMBODIMENTS

Figure 9:
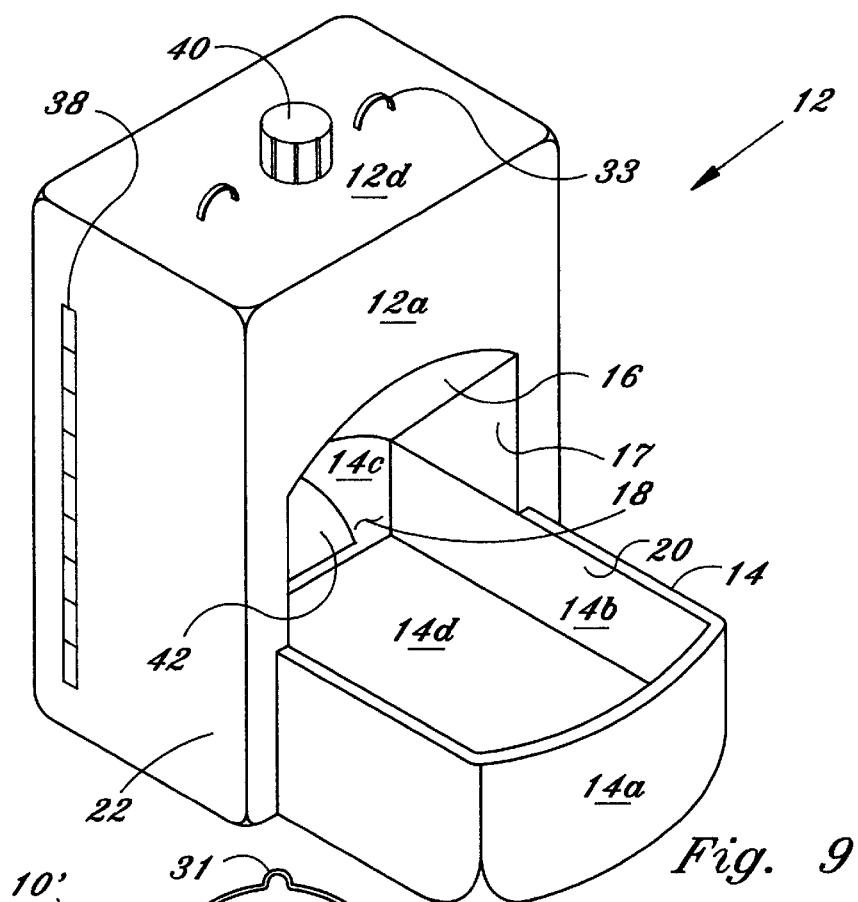
FIG. 9 is a front isometric view of an alternative embodiment of the dispenser of the instant invention.

With reference to the drawings, FIGS. 1–8 depict the automatic and portable fluid dispenser/replenisher of the instant invention which is general referenced by the numeral 10, wherein the best mode is illustrated in FIGS. 1–3 and 5a–7. The fluid dispenser 10 of the instant invention generally comprises a main container or tank 12, trough/reservoir 14, handle 30, spill resistant lip 20, fluid control valve 22 and notched securing tabs/anchors 34. The dispenser 10 also includes a handle 30 which works together with the anchors 34 and a substantially clear or translucent gauge 38 extending between the tank top surface 12d and bottom surface 12e. The main tank 12 provides a constant supply of fluid/water 50 to the trough 14 through the control valve 22. Thus, as fluid 50 is consumed by a horse, pet or livestock, from the trough/reservoir 14, the valve 22 replenishes the fluid 50 provided it is in the open position as shown in FIG. 2b. With reference to FIG. 2b, the valve 22 provides a flow of fluid 50 from the tank 12 into the trough 14 so long as the valve is open and the outlet port 24 is not covered by fluid 50. When the reservoir 14 is covered by the fluid a vacuum seal is created to prevent the further flow of fluid. It should be noted that the instant invention may be employed with any type of fluid, including water and other drinkable liquids. Consequently, any reference to water herein may be substituted with any desirable fluid without departing from the scope and spirit of the instant invention. Moreover, in an alternative embodiment the control valve 22 may be interchanged with a supply port 42 to accommodate dry food as discussed infra.

With reference to FIGS. 2a, 2b and 6, the tank 12 of the instant invention comprises a front wall 12a, side walls 12b, rear wall 12c, top surface 12d and bottom surface 12e. The tank walls 12a –12c are preferably planar or define a rectangular cross section to facilitate placement against a planar surface, but may alternatively comprise a cylindrical shaped container for placement in a corner. The tank 12 defines a chamber 13 in which the water 50 or other desired fluid is stored. A fluid fill and cap combination 40 preferably projects from the top surface 12d and may be centrally located as shown in FIGS. 1 and 6, or it may alternatively be offset to the side as shown in FIG. 8. To fill the tank 12, the cap is removed and then replaced when finished. The edges and corners of the tank 12 are preferably rounded or smooth such that there is a smooth transition between the walls 12a –12e to minimize any potential injury.

Referring to FIGS. 2a, 2b, and 6, the trough 14 provides a drinking reservoir partially recessed in the tank 12 at one end and projecting from the tank 12 proximal the tank's bottom surface so that water 50 gravitates to the reservoir 14. With reference to FIGS. 3 and 6, the reservoir 14 preferably comprises a spill resistant shape to force the fluid back into the reservoir rather than allowing it to escape. Thus, the reservoir 14 preferably provides a lip 20 extending around and projecting inwardly from the sidewalls 14b and front wall 14a just below its upper edge or some predetermined distance below the sidewalls' upper edge. The lip 20 helps to prevent or reduce the spilling of water 50 from the trough 14. The trough 14 and tank 12 preferably comprise an integral or unibody unit for ease of construction and clean, sealed edges. Alternatively, the trough 14 may be sealingly and securely attached to the tank 12. The trough 14 comprises a front end/surface 14a, side surfaces 14b, a back end/surface 14c and bottom surface 14d. Like the tank 12, the edges and corners of the trough 14 are preferably rounded or smooth such that there is a smooth transition between the walls 14a–14d to minimize any potential injury and for comfort and convenience to the animal. The tank's bottom surface 12e and trough's bottom surface 14d are preferably in alignment and planar to provide an integral and level bottom for balancing and supporting the dispenser when it is placed on the ground. The back end 14c of the trough 14 penetrates into the tank 12 so that an arcuate recessed opening 18 may be formed thereabove, as shown in FIG. 6. This provides clearance for the animal to drink without obstruction and to capture any splashing that may occur, as seen in FIG. 2b.

The recessed opening 18 is preferably arcuate and defined by a recessed upper wall 16 and recessed adjoining sidewalls 17 integrally joined together. The recessed upper wall 16 and tank front wall 12a preferably define an arcuate edge 19 where the two walls meet. Beginning at the arcuate edge 19, the recessed upper wall 16 angles downward and inward into the tank 12 until joining the trough back end 14c. The recessed sidewalls 17 join the recessed upper wall 16 to the trough 14, proximal its back end 14c, so as to completely and sealingly close off the opening 18. The walls 16, 17 and trough 14 are preferably integrally joined, but may be otherwise so long as no leaks exist between the joints. The trough back end 14c, trough side walls 14b, recessed sidewalls 17 and recessed upper wall 16 separate the trough 14 and tank chamber 13 and are completely impervious so that the only path through which water 50 can enter the trough 14 is through the flow control valve 22. Once the water 50 rises to a level which covers the valve 22, a vacuum seal is created so that no more water 50 enters the trough. When the water 50 drops down enough to break the vacuum seal, the tank 12 replenishes the water lost so that a constant supply of fresh water 50 is available.

The flow control valve 22 provides a slidable on/off valve disposed in an aperture defined by the trough back end 14c. Referring to FIGS. 4a and 4b, the preferred flow control valve 22 comprises a shaft, a plurality of orifice inlet ports 23 defined by the shaft, a concentric flange 28 at one end of the shaft, a plug 26 at an opposite end of the shaft, an o-ring/gasket 27 and an outlet port 24 defined by the shaft and the flange 28. The inlet ports 23 fluidly communicate and cooperate with the outlet port 24 through a central passage defined by shaft. The flange 28 is concentrically disposed around the shaft at one end and resides in the trough 14 when the valve 28 is installed. The flange 28 serves two purposes. It provides structure for pulling and pushing the valve 22 into a first closed position and second open position, respectively, and it provides a stop for keeping the valve 22 from passing completely through the aperture in the back end 14c of the trough 14. Likewise, the plug 26 provides a stop, but resides in the tank chamber 13. The valve 22 is placed at a predetermined distance above the bottom surface 14d so that the water 50 never rises above that level and to provide space at the bottom of the chamber for sentiment in the water to settle.

To operate the valve 22, the user pulls on the flange 28 to close the valve 22 and pushes on it to open the valve 22. In the closed position, the inlet ports 23 and outlet port 24 are positioned on the trough side of the dispenser 10. In the open position, the inlet ports 23 are disposed in the tank chamber 13 to receive water 50 from the tank 12, while the outlet port 24 remains in the trough 14 to dispense water 50 therein. Water continues to flow through the inlet ports 23 and outlet port 24 into the trough until the water 50 rises to a level that completely covers the outlet port 24. Once the outlet port 24 is completely covered by water, a seal is created and water can no longer flow into the trough 14. To prevent any potential leaks, an O-ring 27, preferably rubber or pliable plastic, can be inserted over the shaft and against the plug. However, as soon as the outlet port 24 is exposed water 50 once again flows through the valve 22 to replenish lost water 50. A plurality of inlet ports 23 is preferred so that the valve 22 can be turned without losing communication between the water 50 and the valve 22. In another embodiment, a single elongated inlet port 23' is provided, as shown in FIGS. 5a and 5b. In the alternative embodiment, the valve 22 must be oriented with the inlet port 23' in the supine position. In either embodiment, the flow control valve 22 preferably comprises a single unitary piece. It should be noted that the instant invention is designed so that the valve 22 does not interfere with the horse, or other animal, when in the open position for drinking, as seen in FIG. 2b. The valve 22 is typically placed in the closed position to move or carry the dispenser 10 without spilling water 50.

The dispenser 10 of the instant invention further comprises a gauge means for monitoring the amount of water 50 being consumed. This allows the animal owner to determine whether the animal is drinking, healthy or sick. The gauge means comprises an elongated translucent visual meter or gauge 38 having indicia markings for determining the amount of water 50 in the tank 12. Thus, one can see through the gauge 38 and compare the water level with markings on the gauge 38. The gauge 38 has the added benefit of facilitating the proper mixture and dosage of medicine with the water 50 so that the proper concentration is achieved. The gauge 38 extends vertically along one of the tank walls, preferably the side 12b, between the top and bottom surfaces 12d, 12e.

The instant invention may also include a filtering means for removing sentiment from the water 50. Although some natural filtration occurs with larger sentiment resting on the bottom of the chamber 13, an additional filtration system could further purify the water. To enhance and further effectuate the filtering process, a filter screen 29 of a predetermined density may be oriented and secured directly to the valve over the inlet ports 23. This would afford the user the opportunity to remove and change the filter screens by pulling the valve 22 out and making the substitution. Alternatively, the filter screen may also be suspended in the chamber 13 in the vicinity of the valve 22 to filter water before it reaches the valve 22.

One of the main attributes of the instant invention is the transportability of the dispenser 10. The water dispenser 10 may be easily carried and used in any location. The dispenser 10, therefore, includes a handle means for carrying the dispenser 10. The handle means may comprise an integrally combined handle 30 projecting from the tank's top surface 12d or one that is securely and sealingly attached by hardware, as seen in FIG. 8. With reference to FIGS. 1 and 6, the preferred handle means comprises a removable handle 30 rotatably attached to corresponding hooks 33 projecting from the top surface 12d. The hooks 33 are securely and sealingly attached to the tank 12 at both ends at a predetermined distance from each other corresponding to the separation distance between the ends of the handle 32. The handle ends have cooperating hooks 32 that grip the tank hooks 33 and allow the handle 30 to rotate, which has an additional benefit discussed hereto. Referring to FIG. 1, the handle 30 may also form a raised arcuate hook 31 proximal the central portion of the handle for hanging on a wall with corresponding hardware.

As it is a main object of the instant invention to be able to use and secure the dispenser 10 when travelling in an automobile or truck or when transporting a horse or other livestock in a trailer, the dispenser 10 further comprises a securing means for stabilizing the dispenser 10 to prevent or reduce spilling. With reference to FIG. 7, the securing means preferably comprises a plurality of notched tabs 34 depending proximal the tank's lower end. The notched tabs 34 are designed to hook onto corresponding hardware, such as nails or screws, when the dispenser 10 is hung on a wall, whether in a vehicle or building. The notched tabs 34 work in conjunction with the handle 30 and raised arcuate hook 31, whereby the arcuate hook 31 rests on corresponding wall hardware and the notched tabs 34 grasp properly aligned hardware. In an alternative embodiment, the securing means may comprise a plurality of open ended anchors 34' for hanging on wall hardware. The anchors 34' preferably project outward from the tank sidewalls 12b and proximal the rear wall 12c.

The instant invention is preferably manufactured by an injection molding process or some similar procedure to reduce costs. Alternatively, or by way of necessity, the fluid dispenser 10 may be manufacture in two halves and then sealingly and permanently joined together as is known in the art. The water dispenser 10 is preferably made from a material comprising a synthetic plastic, resin composite, polymer plastic, thermo-plastic, fiberglass, synthetic rubber, structural foam or any combination of the foregoing materials. These materials have been found to be durable, light in weight and resistant to excessive wear and tear.

Figures 10, 11:
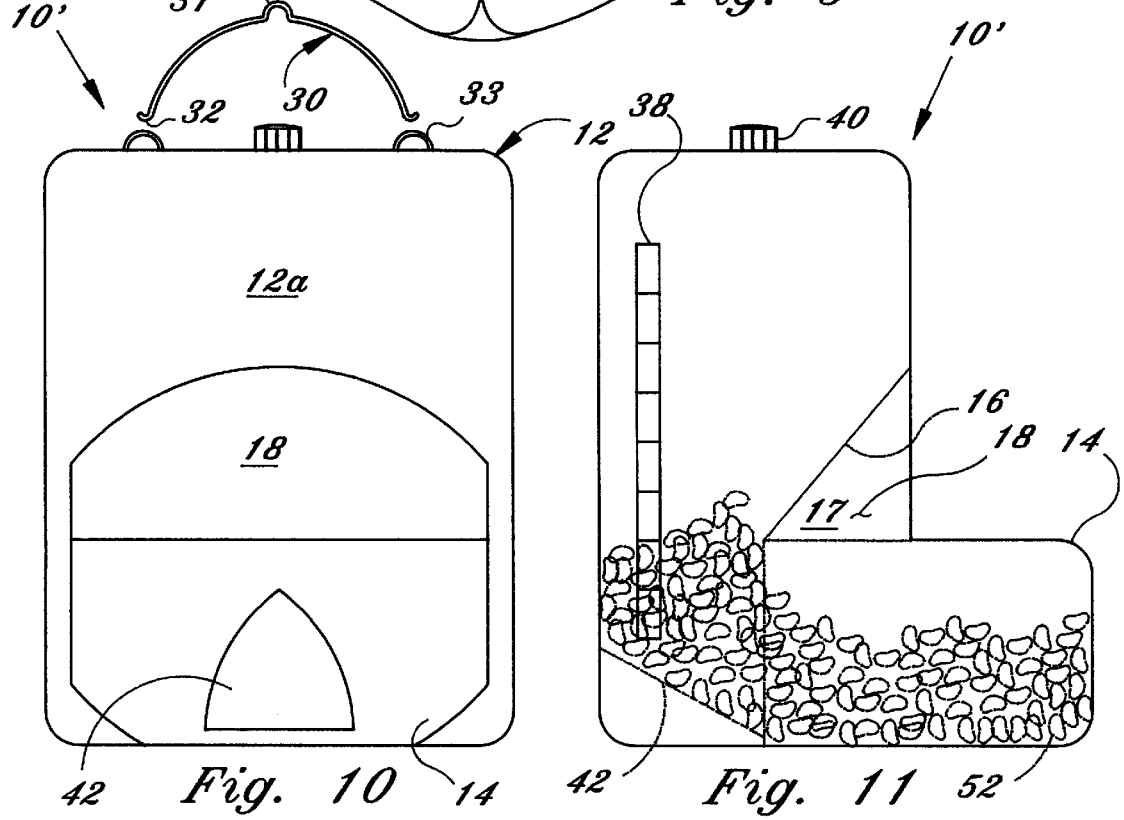
FIG. 10 is a front elevational view of the alternative embodiment of the present invention.
FIG. 11 is a side elevational view of the alternative embodiment of the instant invention illustrating food contained therein.

In an alternative embodiment, the instant invention may be modified slightly for dry food to facilitate a constant supply of food in the reservoir 14. The alternative dispenser 10' of the instant invention operates under the same basic theory and comprises all the elements as disclosed herein except with respect to the control valve 22. In the alternative design, the automatic dispenser 10' comprises a ramp 44 disposed in the chamber 13 behind the reservoir back wall 14c and a supply port 42. The supply port 42 replaces the control valve 22. With reference to FIGS. 9–11, the ramp 44 is positioned against or secured to the interior surface of the tank rear wall 12c and has a downward grade towards the tank bottom surface 12e and preferably terminating at the lower edge of the supply port 42 against the reservoir back wall 14c. The downward slope of the ramp 44 allows dry food 52 to slide through the supply port 42 and into the reservoir 14. The supply port 42 is substantially triangular to facilitate the proper flow, but may comprise other geometric shapes as well. Once food 52 in the reservoir 14 reaches a level sufficient to cover the supply port 42 further flow is prevented until a certain amount of food is consumed from the trough 14 re-exposing the supply port 42. In a modification to the alternative dispenser 10', the supply port 42 may have a slidable door which can be opened for operation and closed for storage and which does not interfere with the animal. As discussed above, the alternative dispenser 10' provides an arcuate recessed opening 18, in accordance with a main object of the instant invention, to provide clearance for the horse, livestock, pet or animal to conveniently access the food 52 without knocking over the dispenser 10'. In addition, the alternative dispenser 10' includes the gauge 38 for monitoring food level, a handle 30 and a securing means as discussed above. The handle 30 may be permanently attached or rotatably attached to hooks 33. The securing means may work in conjunction with the handle and include notched tabs 34 or anchors 34'.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A transportable and automatic fluid dispenser for providing a virtually constant supply of fluid to an animal, said fluid dispenser comprising:

a main tank for storing a main supply of drinkable fluid, said tank comprising a front surface, side surfaces, a rear surface, a top surface and a bottom surface defining a tank volume;

a fluid reservoir for providing a predetermined amount of fluid for drinking by the animal, said reservoir projecting outward from said tank and partially penetrating said tank volume a recessed opening defined in said front surface by a plurality of walls protecting into said tank volume over the portion of said fluid reservoir penetrating said tank volume, said recessed opening having a size for receiving an animal's nose and mouth to prevent spilling of the fluid and toppling of the fluid dispenser while the animal is drinking;

said main tank and said fluid reservoir comprising an integral unit to provide a stable fluid dispenser that is resistant to knocking over;

means for transporting said fluid dispenser to desired locations for use; and an automatic fluid control valve means, fluidly communicating said tank with said reservoir, for automatically dispensing and replenishing fluid in said reservoir from the fluid in said tank.

2. A fluid dispenser as recited in claim 1, wherein said plurality of walls comprises:

at least one impervious wall joined to said tank front surface at one end and to a back wall of said reservoir at an opposite end so that said impervious wall projects inward and downward with respect to said tank front surface to define said recessed opening.

3. A fluid dispenser as recited in claim 2, wherein said impervious wall is arcuate.

4. A fluid dispenser as recited in claim 1, wherein said valve means comprises:

a shaft slidably positioned in said reservoir back wall;

at least one inlet port defined by said shaft for receiving fluid from said tank when said shaft is slid into a first position; and an outlet port in fluid communication with said at least one inlet port for dispensing the fluid received by said inlet port into said reservoir until said outlet port is covered by the fluid.

5. A fluid dispenser as recited in claim 1, further comprising:

securing means for stabilizing said tank on a wall to prevent movement of said tank.

6. A fluid dispenser as recited in claim 1, wherein said securing means comprises:

at least one hook attached to said tank for hanging said dispenser on a wall; and at least one notched tab projecting from said tank rear surface for securing said tank proximal said bottom surface.

7. A fluid dispenser as recited in claim 6, wherein said transporting means comprises a handle projecting from said tank top surface.

8. A fluid dispenser as recited in claim 1, further comprising:

a gauge means for monitoring the amount of fluid in said tank.

9. A fluid dispenser as recited in claim 8, wherein said gauge means comprises:

a vertically oriented translucent strip defined by said tank for visually inspecting the amount of fluid in said tank.

10. A fluid dispenser as recited in claim 1, further comprising:

spill prevention means, defined by said reservoir, for preventing fluid from spilling out of said reservoir.

11. A fluid dispenser as recited in claim 1, wherein said spill prevention means comprises:

an elongated lip projecting inwardly from walls defined by said reservoir to force fluid back into said reservoir.

12. A transportable and automatic fluid dispenser for providing a virtually constant supply of fluid to an animal, said fluid dispenser comprising:

a main tank for storing a main supply of drinkable fluid, said tank comprising a front surface, side surfaces, a rear surface, a top surface and a bottom surface defining a tank volume;

a fluid reservoir for providing a predetermined amount of fluid received from said tank for drinking by the animal, said reservoir projecting outward from said tank and partially penetrating said tank volume such that a back wall of said reservoir is positioned between said front surface and said rear surface;

a recessed opening defined in said front surface by said reservoir back wall and at least one impervious wall projecting into said tank volume, said impervious wall fluidly separating said tank from said reservoir and being positioned over the portion of said fluid reservoir penetrating said tank volume, said recessed opening having a size for receiving an animal's nose and mouth to prevent spilling of the fluid and toppling of the fluid dispenser while the animal is drinking;

said main tank and said fluid reservoir comprising an integral unit to provide a stable fluid dispenser that is resistant to knocking over;

a handle projecting from said top surface for transporting said fluid dispenser to desired locations for use; and an automatic fluid control valve means for automatically dispensing and replenishing fluid in said reservoir.

13. A fluid dispenser as recited in claim 12, further comprising:

spill prevention means, defined by said reservoir, for preventing fluid from spilling out of said reservoir.

14. A fluid dispenser as recited in claim 13, wherein said spill prevention means comprises:

an elongated lip projecting inwardly from walls defined by said reservoir to force fluid back into said reservoir.

15. A fluid dispenser as recited in claim 14, wherein said impervious wall is arcuate.

16. A fluid dispenser as recited in claim 15, wherein said valve means comprises:

a shaft slidably positioned in said reservoir back wall;

at least one inlet port defined by said shaft for receiving fluid from said tank when said shaft is slid into a first position; and an outlet port in fluid communication with said at least one inlet port for dispensing the fluid received by said inlet port into said reservoir until said outlet port is covered by the fluid.

17. A fluid dispenser as recited in claim 16, further comprising:

securing means for stabilizing said tank on a wall to prevent movement of said tank.

18. A fluid dispenser as recited in claim 17, wherein said securing means comprises:

at least one hook; and at least one notched tab projecting from said tank for securing said tank proximal said bottom surface.

19. A fluid dispenser as recited in claim 16, further comprising:

a gauge means for monitoring the amount of fluid in said tank.

20. A fluid dispenser as recited in claim 19, wherein said gauge means comprises:

a vertically oriented translucent strip defined by said tank for visually inspecting the amount of fluid in said tank.

* * * * *